April 2, 1968     W. M. WELLS, JR     3,375,664
CONVECTION CURRENT POWER GENERATOR
Filed Aug. 2, 1966
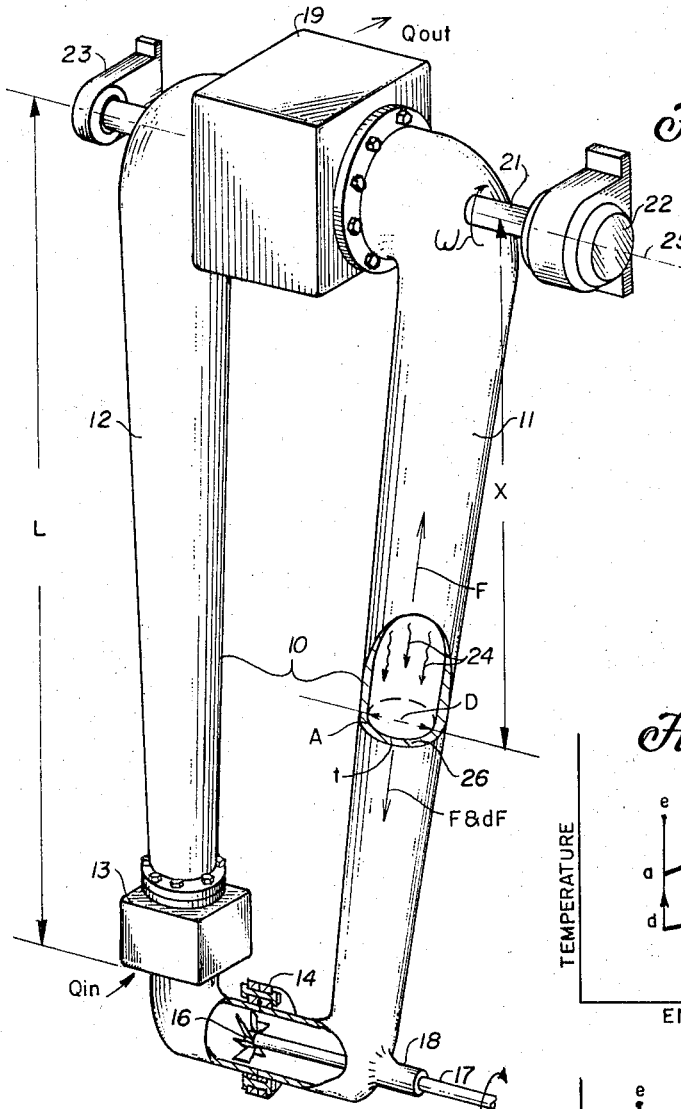
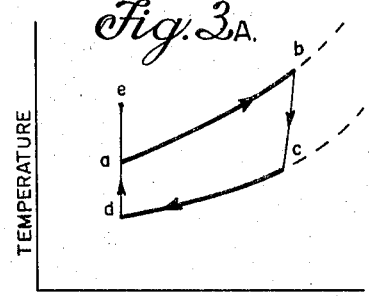
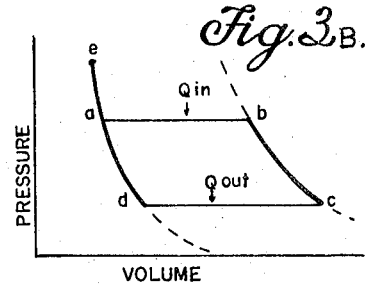
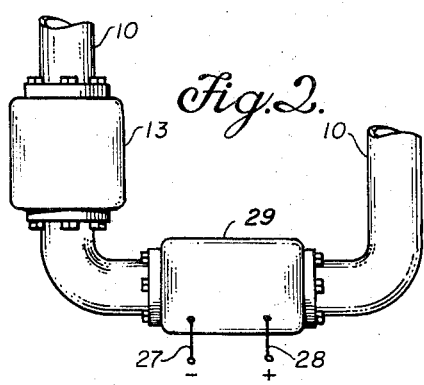
INVENTOR.
WILLIAM M. WELLS JR.
BY Roland A. Anderson
ATTORNEY United States Patent Office 3,375,664
Patented Apr. 2, 1968

3,375,664
CONVECTION CURRENT POWER GENERATOR
William M. Wells, Jr., Livermore, Calif., assignor to the United States of America as represented by the United States Atomic Energy Commission
Filed Aug. 2, 1966, Ser. No. 569,760
10 Claims. (Cl. 60—92)

The invention described herein was made in the course of, or under, Contract No. W-7405-ENG-48 with the United States Atomic Energy Commission.

The present invention relates generally to thermodynamic engine power sources, and more specifically to a closed thermodynamic loop conduit adapted to transport therethrough, by convection heating and cooling, a continuously circulating fluid. A power extraction apparatus, e.g., a turbine, disposed within the loop is adapted to convert the kinetic energy of the circulating fluid into an alternate form of energy such as rotary shaft motion in the case of the aforementioned turbine.

Of the various schemes, either proposed or currently in use for the generation of usable power by the thermodynamic cycling of liquids or gases through power generating apparatus, a preponderance suffer from one or both of the following difficulties: (a) machinery in the form of a compressor must be utilized to produce compression at some point in the thermodynamic cycle of the working fluid; (b) the power extraction machinery, e.g., a turbine, must usually be employed in the "hot" cycle of the working fluid. These two problems, identified supra, will be discussed more fully below.

Illustrative of the first difficulty just noted is the compression apparatus associated with the standard aircraft turbojet engine. This equipment is frequently heavy and serves to degrade the total effective power output of the engine. Since the working fluid traversing such an engine will undergo roughly two isentropic, i.e., constant entropy, and two isobaric, i.e., constant pressure, processes, one may consider the process to be essentially a modified Brayton or Joule cycle process when the working fluid is a gas. Brayton cycle processes usually require a large fraction of gross power output to be returned to a compressor in order to drive the working fluid through the required isentropic and isobaric cycles. It has been observed that as much as 25% of the total power generated in some Brayton cycle apparatus must be reinvested to drive compression equipment.

The second problem is a very serious limitation imposed by the extremely erosive and weakening effects of high temperature working fluids on conventional energy conversion devices, e.g., turbines, so that many of these devices, e.g., turboelectric generators, are limited to an operating temperature range of 900–1400° F. Any rapidly moving apparatus exposed to the corrosive effects of such high temperature atmospheres for prolonged periods of time are subject to extreme dynamic stress and require close machine tolerances in moving parts of the apparatus. A reduction in the degree of these stresses would be of considerable consequence.

According to the present invention, a working fluid is enclosed in a continuous loop conduit and is circulated through the conduit by the convection heating and cooling of the fluid in accordance with a Brayton cycle thermodynamic process. The apparatus is fabricated of hollow cylindrical sections of piping connected to each other to form a closed loop conduit defining a prolated circle having opposed pole or end regions. The two sections of conduit piping extending between these two opposed end regions define opposed leg members of the loop conduit and are arranged generally parallel to the existing acceleration field. A heat source located in the lower portion of one of the leg members supplies a measured amount of heat, $Q_{in}$, per unit time to the working fluid enclosed by the leg member. As the working fluid is heated, it will expand, thereby decreasing in density and creating a rising convection current in the leg member. As the fluid rises in the piping, it eventually encounters a heat sink appended to the top of the loop conduit. At this point, the fluid releases its acquired heat energy, $Q_{out}$, and descends along the other leg member of the loop conduit back to the heat source due to increased density as a result of cooling at the heat sink.

During this process of heating and cooling, a density gradient is established between the fluid in the "hot" or expansion leg and the "cold" or compression leg of the loop conduit. The heavier fluid in the compression leg will exert a propulsive or connective force upon the fluid in the expansion leg, thereby effecting its continuous circumvolution through the loop conduit. Power conversion apparatus, e.g., a turbine or a magnetohydrodynamic generator, situated at the lowest point in the loop conduit is employed to convert the kinetic energy of the circumvolving fluid into a more readily usable form of energy such as rotary motion in the case of a turbine or electrical energy in the case of an MHD, i.e., magnetohydrodynamic, generator.

Two salient features of the present invention now become apparent. First, the system does not require a mechanical compressor to circulate the working fluid. The existing gravity field plus the differential thermal gradients existing between the top and the bottom of the two legs of the loop serve to exert a net continuous compressive force on the fluid in the cold leg of the loop. Secondly, a turbine or similar power extraction apparatus so located in the "cold" leg of the loop conduit avoids the high stresses and erosive environment normally experienced by such apparatus when they are located in a high temperature environment.

A principal object of the present invention is to provide an apparatus for the generation of usable mechanical or electrical energy by the continuous convective circulation of a working fluid through a closed loop utilizing continuous heating and cooling of selected segments of the fluid loop.

Another object of the present invention is to provide power generating apparatus in which compressive equipment is not required to drive the working fluid through a thermodynamic cycle within the apparatus.

A further object of the present invention is to provide a power generating apparatus in which a power extraction device, e.g., a turbine, is employed to divest energy during the "cool" phase of a circulating working fluid.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts, and in which:

FIGURE 1 is the principal contemplated embodiment of the loop conduit of the present invention.

FIGURE 2 depicts the lower portions of the loop conduit with an MHD electrical generator employed as a power conversion means.

FIGURE 3a illustrates a modified Brayton cycle diagram for the working fluid of the present invention when the fluid is a gas.

FIGURE 3b illustrates an ideal P–V program for the working fluid in the system of the present invention when the fluid is a gas.

Referring now to the drawings, in FIGURE 1 there is shown one embodiment of a loop conduit 10 comprising a "cold" of compression leg member 11 and a "hot" or expansion leg member 12. Located in the lower portion of the expansion leg member 12 between points $a$ and $b$ referring to the diagrams of FIGURE 3a and FIGURE 3b of the loop conduit 10 is a heat source 13. Typically, this heat source 13 is a nuclear reactor core disposed within and enclosed by leg member 12, a heat exchanger apparatus located within leg 12 and connected to an external heat source (not shown), or other equivalent device for delivering a specified quantity of heat, $Q_{in}$, to a working fluid disposed therein.

Situated between points $a$ and $e$ (FIGURES 3a and 3b) of the loop conduit 10 and near the juncture 14 of leg member 11 with leg member 12 is a prime mover, i.e., an apparatus designed to derive and modify force and motion from the circulating working fluid to drive external machinery (not shown). The prime mover can be in the form of a turbine 16 with a rotatable shaft 17 egressing through a support bearing 18 in the lower portion of leg member 11. The emergence of shaft 17 through leg member 11 is not a strict requirement; shaft 17 may also be directed through a similar support bearing (not shown) in the lower portion of leg member 12 or by other equivalent means.

At the top portion of loop conduit 10 between leg members 11 and 12 and between points $c$ and $d$ referring to the diagrams of FIGURES 3a and 3b of the loop conduit is a heat sink 19 arranged to extract a given quantity of heat, $Q_{out}$, from the working fluid. As in the case of the heat source 13, the heat sink 19 may comprise conventional radiator schemes suitable for the extraction of heat from a working fluid, e.g., a radiator which exposes a maximal surface area to a separate cooling fluid, or radiates heat into a heat sink such as the vacuum of space, etc. With the foregoing arrangement, a working fluid, e.g., water, inert gas, liquid metal or the like disposed in the loop circuit will generally be heated by source 13, rise in conduit leg 12, be cooled and densified in heat sink 19, descend in conduit leg 11 and expend its energy in prime mover 14, and then return to heat source 13 for recycling.

While the apparatus may be operated in a natural gravity field generally parallel to leg portions 11, 12, in space applications and for compactness a centrifugal acceleration field is preferred. To obtain such a field there is attached to the top of loop conduit 10 a rigid, rotatable shaft 21 engaged at one of its end portions to a rotator means 22 and supported at the other end point by a stationary bearing structure 23. The loop conduit 10 is then rotated as a unit around the axis 25 of shaft 21.

In FIGURE 2, there is shown the lower portions of the loop conduit 10 of FIGURE 1, modified to include an MHD electric generator 29 in lieu of the turbine 16. The MHD generator 29 is affixed at the juncture 14 of leg members 11 and 12 as shown in FIGURE 2. The principle of operation of an MHD generator, as in the case of a conventional wire wound generator, is based on Faraday's law which states that the electromotive force (voltage) induced in a circuit is proportional to the time rate of change of the magnetic flux through the circuit.

In the case of a conventional generator, this circuit comprises a wire wound armature rotating in a magnetic field. The MHD generator employs a high velocity, electrically conductive fluid, e.g., salt water, ionized gases, mercury, cesium, potassium, etc., traversing a magnetic field to create an electrical current flow within the fluid that will be perpendicular in direction to both the magnetic field and the fluid flow. An MHD generator employing these principles and suitable for use in the present invention is disclosed in an article entitled "MHD with Liquid Metal" by H. E. Weber and C. H. Marston, Mechanical Engineering, August 1964, pp. 34–37. The apparatus disclosed in the above article employs a spinning annulus of conducting fluid as an "armature" situated in a magnetic field. Although the reference article describes the fluid "armature" as driven by a high pressure, high temperature vapor, the apparatus is readily adaptable for use in the compression leg of the present invention by injecting the high pressure cooled fluid located at the bottom of the leg member into the rotating fluid "armature" in order to spin it within the magnetic field created inside the MHD generator. An alternate location for the MHD generator of the present invention is in the expansion leg 11 above the heat source 13. In this location, the fluid "armature" of the generator is driven by the high temperature vapor rising upwardly from heat sink 13. Electrical power generated by the MHD device is extracted via terminals 27 and 28 as shown in FIGURE 2.

In operation, the pressure density gradient established between the fluid in the compression leg and the expansion leg of the loop conduit serves to maintain a continuous circulation of the working fluid around the conduit. Proper placement of the heat sink 19 as shown in FIGURE 1 is critical to the efficient operation of the present invention. The heat sink 19 must be positioned midway between leg members 11 and 12 as shown in FIGURE 1, or displaced slightly in the direction of the compression leg 11. In either of the two locations noted above, the momentum of the fluid rising in the expansion leg will propel the densified working fluid in the heat sink over into the compression leg. Relocation of the heat sink in the expansion leg could result in a back flow of condensed fluid descending the expansion leg into the heat source with a consequent decrease in the net efficiency of the system.

Another critical parameter associated with the present invention relates to the location of the heat source. For the most efficient operation of the present invention, this component must be situated in the lower portion of either leg member 11 or 12 of the loop conduit. Unlike the heat sink, the heat source cannot be located at the juncture 14 (FIGURE 1) of leg members 11 and 12 since at this location the fluid motions would no longer be unidirectional and will attempt to ascend both leg members simultaneously, thereby rendering the device inoperative.

The fluid employed in the cycling process of the present invention may exist in either a single or two-phase state during its transit around the loop conduit, depending, in part, on the operating temperature ranges within the loop conduit. In a single phase state, the working fluid will remain either in a gaseous or in a liquid condition as it traverses both the heat sink and the heat source of the loop conduit. In the two-phase state, the working fluid will be vaporized during its passage through the heat source and will be liquified while traversing the heat sink. It is possible to operate the present invention utilizing a mixture of a single-phase fluid with a double phase fluid or by employing exclusively either a single or a double phase fluid, available coolants, heat transfer agents, and even refrigerant compositions can be used to accommodate requisite temperature conditions at high temperatures.

To further illustrate the operation of the present invention, it is desirable to understand in greater detail the function and specification of the two leg members 11 and 12. In addition to providing structural support for the heat source 13, the turbine 16, and the heat sink 19, as shown in FIG. 1, and serving as an efficient pathway for confining the pressurized working fluid 24, leg members 11 and 12 must also function as highly efficient heat insulators. For the loop conduit to operate properly, heat must be prevented from escaping from the fluid in the expansion leg, and the fluid in the compression leg must be prevented from absorbing heat. The use of structural materials of very low thermal conductivity for use in leg members 11 and 12 is one satisfactory method of handling this problem.

To better comprehend the method of operation of the present invention, it is necessary to formulate relationships between the cross sectional area A, the mass M, and the wall thickness $t$ of the loop conduit 10 in terms of the various parameters associated with the system. We first consider a cross sectional annulus 26 of conduit piping located along leg member 11 at a distance $x$ from the rotational axis 25, as shown in FIGURE 1. To facilitate explanation, the following notation will be used:

$dx$—the longitudinal thickness of the pipe cross sectional disk 26 as shown in FIG. 1.
$x$—the distance of pipe cross sectional disk 26 from the axis of rotation 25.
$t$—the wall thickness of pipe annulus 26 as shown in FIGURE 1.
L—the total length of leg member 11.
A—the radial pipe cross sectional area of annulus 26 as shown in FIG. 1.
M—total pipe mass for leg member 11.
$dM$—mass of disk 26.
$\rho$—pipe density.
$\sigma$—tensile stress along pipe leg member 11.
F—total tensile force along pipe leg member 11, acting on anulus 26 in the direction of fluid flow 24 within leg member 11.
$dF$—increment of total tensile force.
$\omega$—angular velocity of rotation of leg member 11 around axis 25.
D—inner diameter of annulus 26 as shown in FIGURE 1.
$P_e$—internal pressure at point $e$ along loop conduit 11.

By Newton's second law, the forces acting upon annulus 26 are given by the expression:

(1) $$F+dF-F=dM\ \omega^2 X$$

However, since it is obvious that $dM=\rho A dx$ and by definition $F=\sigma A$ where all the piping in the conduit loop 10 is designed such that $\sigma$ will be constant, one can rearrange Equation 1 to read:

(2) $$\frac{dA}{A}=-\frac{\rho w^2}{\sigma}x\,dx$$

Integration of Equation 2 yields the expression:

(3) $$\ln A = C - \frac{\rho w^2}{2\sigma}x^2$$

where C is a constant of integration. To evaluate C, one may consider the following boundary conditions: at $x=L$, A will equal the cross sectional area $A_{end}$ of the leg member 11 at point $e$ of the loop conduit 11. This expression can be shown to equal $$A_{end}=\frac{\pi D^2}{2\left(\frac{\sigma}{P_e}-1\right)}$$

Substituting this information into Equation 3 produces an expression for C given by:

(4) $$C=\ln\left[\frac{\pi D^2}{2\left(\frac{\sigma}{P_e}-1\right)}\right]+\frac{P\omega^2}{2\sigma}L^2$$

Substituting Equation 4 into Equation 3 yields the relationship:

(5) $$\ln\left[\frac{2A\left(\frac{\sigma}{P_e}-1\right)}{\pi D^2}\right]=\frac{P\omega^2}{2\sigma}(L^2-x^2)$$

Rearranging Equation 5 will now produce the required expression for A:

(6) $$A=\frac{\pi D^2}{2\left(\frac{\sigma}{P_e}-1\right)}\exp\left[\frac{\rho\omega^2(L^2-x^2)}{2\sigma}\right]$$

Having obtained an expression for the cross sectional area A of leg member 11 at any point $x$ along its length, one may now determine the radial wall thickness $t$ at any point along leg member 11. The cross sectional area A at any point along leg member 11 can be given alternately by the expression:

(7) $$A=\frac{\pi}{4}[(D+2t)^2-D^2]$$

Substituting Equation 6 into Equation 8 and rearranging terms, one now obtains the desired equation for $t$:

(8) $$t=\frac{-D+\sqrt{D^2+\frac{2D^2}{\left(\frac{\sigma}{P_e}-1\right)}\exp\left[\frac{P\omega^2(L^2-x^2)}{2\sigma}\right]}}{2}$$

Finally, to obtain an expression for the mass M of leg member 11, it should be recalled that the mass of disk 26 is given by the expression $dM=\rho A dx$. Integration of this expression and substituting into it the value for A shown by Equation 7, one obtains the desired result:

(9) $$M=\frac{\rho\pi D^2}{2\left(\frac{\sigma}{P_e}-1\right)}\int_0^L e^{\frac{\rho\omega^2 L^2}{2\sigma}\left(L-\frac{x^2}{L^2}\right)}dx$$

It is now instructive to consider two possible modes of operation. The first is that of operation in a natural gravity field. The second includes spinning the loop conduit 10 around an axis 25 to provide a matched system of paired units rotating, as in space, about an axis therebetween, or to produce an artificial "gravity" field within the loop conduit. This second operation would be applicable to situations in which the natural gravity field is extremely weak or non-existent, such as in space. In both instances, the design parameters of the present invention are essentially similar. For instance, Equation 8 states that the thickness $t$ of leg member 11 increases in going from the bottom to the top of loop conduit 10. This increase is achieved by maintaining a constant internal diameter D throughout the loop 10 while varying the external diameter to satisfy Equation 8. Also, it is observed that the mass M and the cross sectional area A of leg member 11 will increase in a similar fashion while traveling from the bottom to the top of loop conduit 10. This "tapering" of the external diameter of leg member 11 can be perceived as a means for maintaining a constant tensile stress $\sigma$ as every point along the leg member 11.

Although the foregoing analysis was presented for the compression leg 11, the same analysis and conclusions pertain with equal validity to the expansion leg 12. The only difference in the analysis presented for leg 12 as compared with that for leg 11 relate to the resultant values for M, A, and $t$ which will be slightly smaller in the expansion leg 12 than in the compression leg 11 due to the decreased fluid pressure existing in this leg as compared with leg 11, discussed below.

For purposes of elucidation, it will be assumed that the working fluid of the present invention is a gas, and in this instance an ideal gas. In a specific system, the working fluid could be a liquid, a gas, or a combination of a liquid and a gas. Furthermore, the working fluid in a real system will not be ideal, and therefore its properties can be expected to depart from those of an ideal working fluid in a manner understood in the art.

Referring to FIGURES 3a and 3b, as the working gas 24 travels from point $a$ to point $b$ of the loop conduit 10 as shown in FIGURE 1, temperature and volume increases at constant pressure as shown in the FIGURES 3a and 3b. Since the heat source 13 is located between these points, a specific quantity of heat $Q_{in}$ will be supplied. As the working fluid, e.g., a gas, expands and ascends the expansion leg member 12 between points $b$ and $c$, it will be observed that the gas undergoes a temperature and pressure decrease as the total entropy of the system remains fixed. Between points $c$ and $d$ of the loop conduit 10, the gas 24 releases its stored heat energy, $Q_{out}$, to the heat sink 19 at constant pressure while the temperature, volume and total entropy of the gas diminish as shown in FIGURES 3a and 3b. After releasing its stored heat energy, $Q_{out}$, at the heat sink 19, the gas condenses and descends through the loop conduit between points $d$ and $e$ at constant entropy while the temperature and pressure of the gas increases and its volume decreases. Between points $e$ and $a$, the turbine 16 divests energy from the gas 24 with an accompanying pressure, temperature and volume decrease, while the total entropy of the system remains unchanged. The total efficiency for the thermodynamic process just recited is given by the expression:

$$(9) \quad \epsilon = 1 - \left(\frac{p_c}{p_b}\right)\frac{\gamma - 1}{\gamma}$$

where $p_b$ is the pressure at point $b$ of the loop conduit, $p_c$ is the pressure at point $c$, and $\gamma$ is the ratio of the specific heat capacities of the working gas 24 and is given by the relationship $$\gamma = \frac{C_p}{C_v}$$

Equation 9 is an expression for the unregenerated Brayton cycle efficiency of the present system.

Equation 9 is a very generalized expression for the Brayton cycle efficiency; an alternate representation for Equation 9 related more specifically to the parameters of the present system is in the form:

$$(10) \quad \epsilon = \frac{1}{2R}\left[\frac{(\gamma - 1)NLG}{\gamma T_b}\right]$$

where R is the universal gas constant, L is length of either leg member 11 or leg member 12, N is the number of "$g$'s" acceleration experienced by the gas at the lowest portion of the loop conduit 10, G is the molecular weight of the gas 24, and $T_b$ is the temperature at point $b$ of the loop conduit 10.

The efficiency of the system increases with increasing $\gamma$, N, L, and W. In other words, a system having long leg members 11 and 12 encompassing a heavy gas 24 and rotating at high speeds would be the most efficient embodiment of the present invention. To render Equation 10 even more exact, it can be shown through further extensive mathematical analysis that the present system will have an optimum efficiency $\epsilon_{opt}$ given by:

$$(11) \quad \epsilon_{opt} = 1 - \sqrt{\frac{T_d}{T_b}}$$

where $T_d$ is the temperature of the gas as measured at point $d$ of the loop conduit. Associated with this optimum system efficiency $\epsilon_{opt}$ will be a maximum system specific power output $W_{max.}$, generated at the turbine 16 and given by the expression:

$$(12) \quad W_{max} = C_p T_b \left(1 - \sqrt{\frac{T_d}{T_b}}\right)^2$$

where $C_p$ is the specific heat capacity of the gas 24 at constant pressure. Finally, both $\epsilon_{opt}$ and $W_{max.}$ above will occur at an optimum rotational speed given by the expression:

$$(13) \quad (NL_{opt}) = \frac{2\gamma R T_b}{(\gamma - 1)G}\left[\sqrt{\frac{T_d}{T_b}}\right]$$

Utilizing the information engendered by Equations 1–13, it is possible to construct a specific structure employing, in an optimum manner, the essential inventive concepts of the present invention.

*Example*

A system in accordance with the foregoing may be provided with the following parameters:

| | |
|---|---:|
| Inner diameter of the loop conduits _____ft__ | 0.65 |
| Length of the leg members 11 and 12 _____ft__ | 100 |
| Variation in pipe thickness—(a) 0.115″ at the lower end, and 0.203″ at the upper end of the expansion leg 12; (b) 0.170″ at the lower end and 0.289″ at the upper end of the compression leg 11. | |
| Pipe density $p$ _____lb./in.$^3$ (titanium)__ | 0.5609 |
| "$g$" Loading on leg member ends 11 and 12__$g$'s__ | 280 |
| Average molecular weight of gas, e.g., a Xenon-Argon mixture _____ | 100 |
| Heat source temperature $T_b$ _____° R__ | 1750 |
| Heat sink temperature $T_d$ _____° R__ | 700 |
| Turbine inlet temperature $T_e$ _____° R__ | 1070 |
| Heat source pressure $P_b$ _____p.s.i__ | 1500 |
| Turbine inlet pressure $P_e$ _____p.s.i__ | 2130 |
| Ideal thermal efficiency $\epsilon$ _____percent__ | 20.8 |
| Power output W _____mw__ | 4.65 |

Although parameters of a specific embodiment of the present invention are referenced above, the novel features of the apparatus are not to be construed as limited by the parameters recited. It is anticipated that variations in the geometry and design of the loop conduit are quite possible within the scope and intent of the present invention. For instance, the loop conduit 10 may assume any of a variety of forms, such as circle, rectangle, oval, figure 8 "Stellarator" shape, etc. Furthermore, it is not a strict requirement of the system that the prime mover be located in the compression leg 11 of the loop conduit 10. A turbine or an MHD generator could be located at practically any point around the loop conduit 10 where fluid flow is adequate. However, as pointed out previously, the most desirable and efficient location for the prime mover in most applications is in the lower portion of the compression leg 11. The heat source and heat sink may also be repositioned within loop conduit 10 to achieve any convection flow pattern that may be desired.

It is apparent, then, that many modifications and variations of this invention as hereinbefore set forth may be made without departing from the spirit and scope thereof. The specific embodiments described are given by way of example only, and the invention is limited only by the terms of the appended claims.

What is claimed is:

1. In a power generating apparatus, the combination comprising:
   (a) a closed, hollow loop conduit located in an acceleration field and defining first and second spaced-apart pole end regions of said loop conduit, said first end region disposed at a more intense region of said acceleration field relative to all other portions of said loop conduit, said second end region of said loop conduit disposed at a less intense region of said acceleration field relative to other portions of said loop conduit, said loop conduit further defining at least two separate, spaced-apart, longitudinal leg members extending between and connecting said first and second end regions of said loop conduit,
   (b) a working fluid disposed within said loop conduit,
   (c) heating means arranged to supply a specified quantity of heat, $Q_{in}$, to the working fluid at a portion of one of said leg members of the loop conduit proximate said first end region of said loop conduit,
   (d) cooling means arranged to extract a quantity of heat, $Q_{out}$, from the working fluid and densify said working fluid at said second end region of said loop conduit, said heating and cooling means effective to circumvolve a unidirectional convection current of said working fluid around said loop conduit, (e) power extraction means arranged to interact with the circumvolving fluid in said loop conduit and convert the kinetic energy of said circumvolving fluid into an externally available form of energy.

2. A power generating apparatus according to claim 1, further characterized in that said loop conduit defines a prolate circle configuration having first and second pole end regions, with two generally straight, longitudinal, and mutually parallel leg conduit members extending from said first to said second pole end regions of the prolate circle and oriented substantially parallel to said existing acceleration field.

3. A power generating apparatus according to claim 2, further characterized in that said heating means comprises a nuclear reactor core structure disposed at the lower portion of a leg member of said loop conduit proximate said first end region of the loop conduit and arranged to supply a specified quantity of heat, $Q_{in}$, to the working fluid traversing said reactor, and said cooling means comprises a thermal radiator associated with said second end region of the loop conduit, and arranged to divest a specified quantity of heat, $Q_{out}$, from the working fluid traversing said second end region.

4. A power generating apparatus according to claim 3, further characterized in that said power extraction means comprises a turbine rotor disposed within said first end region of the loop conduit, said turbine having a rotary shaft egressing through a wall of said loop conduit to convert the kinetic energy of said circumvolving fluid interacting with the blades of said turbine to rotary shaft motion.

5. A power generating apparatus according to claim 4, further characterized in that said loop conduit leg members are generally cylindrical in configuration and define an inner diameter of substantially uniform cross sectional length and an outer diameter of tapered cross sectional length extending from a maximum diameter proximate said second end region to a minimum diameter proximate said first end region of the loop conduit.

6. A power generating apparatus according to claim 3, further characterized in that said working fluid is electrically conductive, and said power extraction means comprise a megnetohydrodynamic electric current generator arranged to convert the kinetic energy of said circumvolving fluid to externally available electrical current.

7. A power generating apparatus according to claim 6, further characterized in that said loop conduit leg members are generally cylindrical in configuration, and define an inner diameter of substantially uniform cross sectional length and an outer diameter of tapered cross sectional length extending from a maximum diameter proximate said second end region to a minimum diameter proximate said first end region of the loop conduit.

8. A power generating apparatus according to claim 3, further including a rotator means appended to said second end region of said loop conduit and arranged to spin said loop conduit around the rotational axis of said rotator to produce an acceleration field within and substantially parallel to said conduit leg members.

9. A power generating apparatus according to claim 8, further characterized in that said power extraction means comprises a turbine disposed within said first end region of the loop conduit, said turbine having a rotary shaft egressing through a wall of said loop conduit, said turbine adapted to convert the kinetic energy of the circumvolving fluid interacting with the blades of said turbine to rotary shaft motion, said apparatus also characterized in that said loop conduit leg members are generally cylindrical in configuration and define an inner diameter of substantially uniform cross sectional length and an outer diameter of tapered cross sectional length extending from a maximum diameter proximate said second end region to a minimum diameter proximate said first end region of the loop conduit.

10. A power generating apparatus according to claim 9, further characterized in that said working fluid is electrically conductive and said power extraction means comprise a magnetohydrodynamic electric current generator suitable to convert the kinetic energy of said circumvolving fluid to externally available electrical current, said apparatus further characterized in that said loop conduit leg members are generally cylindrical in configuration and define an inner diameter of substantially uniform cross sectional length and an outer diameter of tapered cross sectional length extending from a maximum diameter proximate said second end region to a minimum diameter proximate said first end region of the loop conduit.

References Cited

UNITED STATES PATENTS

| | | | |
|---|---|---|---|
| 226,570 | 4/1880 | Thuemmler. | |
| 868,397 | 10/1907 | Bergmans | 60—92 |
| 2,524,826 | 10/1950 | Pajes | 60—1 XR |
| 3,169,375 | 2/1965 | Velthuis | 60—1 XR |

OTHER REFERENCES

"Magnetohydrodynamic Power Generation," article in "Discovery, the Magazine of Scientific Progress," vol. XXII, No. 8, August 1961, pp. 326–333, 60–202.

D. G. Elliot et al.: "Investigation of Liquid MHD Power Conversion," Third Biennial Aerospace Power Systems Conference, Philadephia, Pa. Sept. 1–4, 1964.

H. E. Weber: "MHD with Liquid Metal," Mechanical Engineering, August 1965, pp. 34–37.

EDGAR W. GEOGHEGAN, *Primary Examiner.*